(12) United States Patent
Vito

(10) Patent No.: US 11,690,414 B2
(45) Date of Patent: Jul. 4, 2023

(54) APPARATUSES, SYSTEMS AND METHODS FOR EQUIPMENT FOR PROTECTING THE HUMAN BODY BY ABSORBING AND DISSIPATING FORCES IMPARTED TO THE BODY

(71) Applicant: Robert A. Vito, Kennett Square, PA (US)

(72) Inventor: Robert A. Vito, Kennett Square, PA (US)

(73) Assignee: MATSCITECHNO LICENSING COMPANY, Kennett Square, PA (US)

( * ) Notice: Subject to any disclaimer, the term of this patent is extended or adjusted under 35 U.S.C. 154(b) by 0 days.

(21) Appl. No.: 17/497,434

(22) Filed: Oct. 8, 2021

(65) Prior Publication Data

US 2022/0175062 A1    Jun. 9, 2022

Related U.S. Application Data

(63) Continuation of application No. 15/383,770, filed on Dec. 19, 2016.

(60) Provisional application No. 62/269,723, filed on Dec. 18, 2015.

(51) Int. Cl.
| | | |
|---|---|---|
| *A41D 13/05* | (2006.01) | |
| *A41D 13/015* | (2006.01) | |
| *B32B 5/26* | (2006.01) | |
| *F41H 5/04* | (2006.01) | |
| *A41D 31/28* | (2019.01) | |

(52) U.S. Cl.
CPC ....... *A41D 13/0518* (2013.01); *A41D 13/015* (2013.01); *A41D 31/285* (2019.02); *B32B 5/26* (2013.01); *F41H 5/0478* (2013.01); *A41D 13/05* (2013.01)

(58) Field of Classification Search
CPC ................ A41D 13/0518; A41D 13/15; A41D 13/0543; A41D 13/00; A41D 13/0512; A41D 13/015; A41D 31/0011; A42B 3/00; A42B 1/08
See application file for complete search history.

(56) References Cited

U.S. PATENT DOCUMENTS

| | | | | | |
|---|---|---|---|---|---|
| 4,513,449 | A | * | 4/1985 | Donzis | A41D 13/0153 2/24 |
| 5,294,181 | A | * | 3/1994 | Rose | A61G 5/1045 297/452.57 |
| 5,423,087 | A | * | 6/1995 | Krent | A41D 31/285 2/463 |
| 5,697,101 | A | * | 12/1997 | Aldridge | A41D 31/085 2/81 |
| 5,701,611 | A | * | 12/1997 | Rector | A63B 71/12 2/268 |

(Continued)

*Primary Examiner* — Jillian K Pierorazio
(74) *Attorney, Agent, or Firm* — Thomas J. McWilliams; Barnes & Thornburg LLP

(57) ABSTRACT

The disclosed apparatus, system and method includes at least a protective garment that prevents concussive effects on internal organs. The garment many include a garment body; and, embedded in the garment body, at least one multi-sectional pad. At least two of the multi-sections may comprise: at least one aramid layer; at least one multi-durometer foam layer having a substantially similar surface area to that provided by the at least one aramid layer; and at least one shield layer.

14 Claims, 3 Drawing Sheets

(56) References Cited

U.S. PATENT DOCUMENTS

| | | | | |
|---|---|---|---|---|
| 6,182,299 B1* | 2/2001 | Chen | A41D 13/0518 | 2/92 |
| 6,295,654 B1* | 10/2001 | Farrell | A41D 13/0158 | 2/108 |
| 6,775,851 B1* | 8/2004 | Chen | A41D 13/0156 | 2/463 |
| 8,898,819 B2* | 12/2014 | Cleva | A42B 3/12 | 2/181.6 |
| 8,997,267 B2* | 4/2015 | Skottheim | A41D 13/0153 | 2/463 |
| D744,168 S* | 11/2015 | Best | D29/101.3 | |
| 2002/0028325 A1* | 3/2002 | Simpson | A43B 13/12 | 428/218 |
| 2003/0070209 A1* | 4/2003 | Falone | B32B 7/022 | 2/463 |
| 2003/0140400 A1* | 7/2003 | Ho | A42B 3/063 | 2/412 |
| 2003/0167560 A1* | 9/2003 | LaShoto | A63B 71/1225 | 2/463 |
| 2004/0109992 A1* | 6/2004 | Gribble | B29C 44/569 | 428/315.9 |
| 2005/0241052 A1* | 11/2005 | Brown | A41D 13/0153 | 2/463 |
| 2006/0048292 A1* | 3/2006 | Gillen | A41D 13/0153 | 2/456 |
| 2006/0080762 A1* | 4/2006 | Kobren | A41D 13/0518 | 2/463 |
| 2007/0102461 A1* | 5/2007 | Carstens | A41D 13/005 | 224/222 |
| 2008/0066217 A1* | 3/2008 | Depreitere | A42B 3/128 | 2/412 |
| 2008/0172779 A1* | 7/2008 | Ferguson | A41D 31/285 | 2/455 |
| 2008/0201828 A1* | 8/2008 | Kanavage | A41D 13/015 | 2/463 |
| 2008/0235855 A1* | 10/2008 | Kobren | A41D 13/0518 | 2/463 |
| 2009/0307829 A1* | 12/2009 | Onrot | A41D 13/0506 | 2/400 |
| 2010/0037374 A1* | 2/2010 | Crelinsten | A41D 13/05 | 2/455 |
| 2010/0306907 A1* | 12/2010 | Fiegener | A63B 71/12 | 2/113 |
| 2011/0005379 A1* | 1/2011 | Wang | F41H 5/0471 | 89/914 |
| 2011/0252549 A1* | 10/2011 | Jourde | A41D 13/0518 | 2/463 |
| 2011/0314589 A1* | 12/2011 | Vito | A42B 1/08 | 2/181 |
| 2012/0060268 A1* | 3/2012 | Crelinsten | A41D 13/05 | 2/463 |
| 2012/0204327 A1* | 8/2012 | Faden | A43B 13/189 | 428/323 |
| 2014/0143939 A1* | 5/2014 | Olivares Velasco | A41D 31/125 | 2/414 |
| 2014/0245525 A1* | 9/2014 | Turner | A41D 13/05 | 2/455 |
| 2015/0181950 A1* | 7/2015 | Skottheim | A41D 13/0531 | 2/463 |
| 2015/0223547 A1* | 8/2015 | Wibby | A42B 3/064 | 2/414 |
| 2015/0374059 A1* | 12/2015 | Farquhar | A42B 1/048 | 2/412 |
| 2017/0151486 A1* | 6/2017 | Liang | A41D 31/285 | |
| 2017/0311659 A1* | 11/2017 | Guidetti | A41D 31/18 | |

* cited by examiner

APPARATUSES, SYSTEMS AND METHODS FOR EQUIPMENT FOR PROTECTING THE HUMAN BODY BY ABSORBING AND DISSIPATING FORCES IMPARTED TO THE BODY

CROSS-REFERENCE TO RELATED APPLICATIONS

This application is a Continuation Application of U.S. application Ser. No. 15/383,770, filed Dec. 19, 2016, entitled: APPARATUSES, SYSTEMS AND METHODS FOR EQUIPMENT FOR PROTECTING THE HUMAN BODY BY ABSORBING AND DISSIPATING FORCES IMPARTED TO THE BODY, which claims priority to U.S. Provisional Patent Application No. 62/269,723, filed Dec. 18, 2015, entitled: APPARATUSES, SYSTEMS AND METHODS FOR EQUIPMENT FOR PROTECTING THE HUMAN BODY BY ABSORBING AND DISSIPATING FORCES IMPARTED TO THE BODY, which are hereby incorporated by reference as if set forth herein in their entirety.

BACKGROUND

Field of the Disclosure

The present disclosure relates to equipment, and, more specifically, to apparatuses, systems and methods for equipment for protecting the human body by absorbing and dissipating forces imparted to the body.

Description of the Background

As will be understood to the skilled artisan, commotio cordis is a concussion of the heart. This cardiac concussion at a particular point in the cardiac cycle can cause cardiac arrest and lead to death, and the condition may be particularly dangerous for youths with more deformable sternums, such as youths under the age of 18. Moreover, youths may be particularly exposed during certain activities, such as during competitive sports play. Other internal organs, such as the liver, brain, kidneys, etc., may likewise be impacted by imparted forces similar to those that may cause commotio cortis.

Distressingly, commotio cordis, although rare, continues to occur, frequently in those wearing protective equipment known in the art. Baseball, lacrosse and hockey are three common sports in which commotio cordis occurs, and these are also sports in which chest-protective equipment is frequently worn by participants, including many of those (estimated to be as many as ⅓) that suffer commotio cordis.

Accordingly, improved apparatuses, systems and methods of protecting the human body by absorbing and dissipating forces imparted to the body are needed.

SUMMARY

The disclosed apparatus, system and method includes at least a protective garment that prevents concussive effects on internal organs. The garment many include a garment body; and, embedded in the garment body, at least one multi-sectional pad. At least two of the multi-sections may comprise: at least one aramid layer; at least one multi-durometer foam layer having a substantially similar surface area to that provided by the at least one aramid layer; and at least one shield layer.

Accordingly, the disclosure provides improved apparatuses, systems and methods of protecting the human body by absorbing and dissipating forces imparted to the body.

BRIEF DESCRIPTION OF THE DRAWINGS

The description herein is made in conjunction with the attached drawings, which form a part hereof, in which like numerals represent like elements, and in which.

DETAILED DESCRIPTION

Figure 1A:
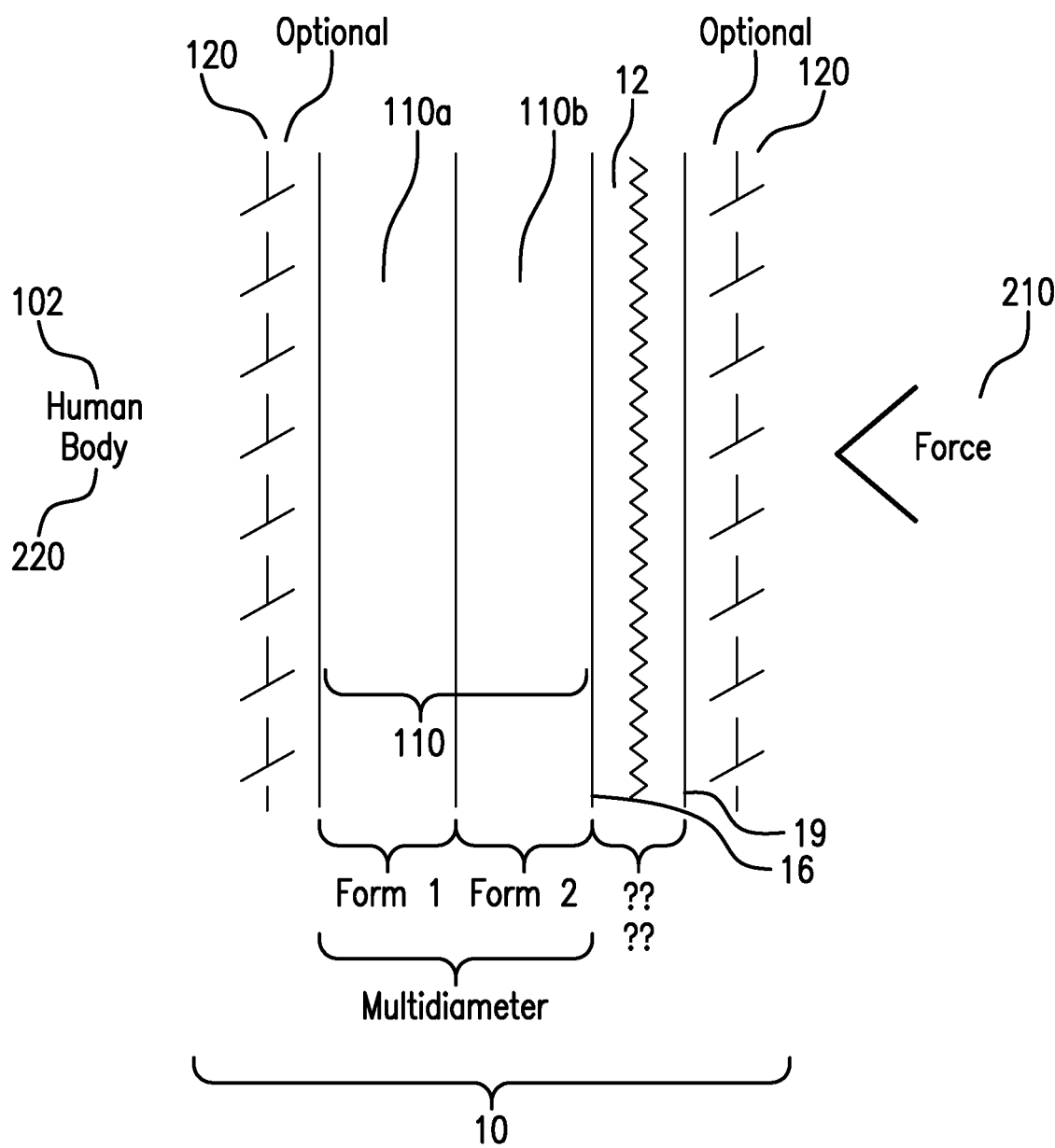
FIGS. 1A and 1B illustrate a multi-durometer protective pad.

The figures and descriptions provided herein may have been simplified to illustrate aspects that are relevant for a clear understanding of the herein described apparatuses, systems, and methods, while eliminating, for the purpose of clarity, other aspects that may be found in typical similar apparatuses, systems, and methods. Those of ordinary skill may thus recognize that other elements and/or operations may be desirable and/or necessary to implement the aspects described herein. But because such elements and operations are known in the art, and because they do not facilitate a better understanding of the present disclosure, a discussion of such elements and operations may not be provided herein. However, the present disclosure is deemed to nevertheless include all such elements, variations, and modifications to the described aspects that would be known to those of ordinary skill in the art.

Exemplary embodiments are provided throughout so that this disclosure is sufficiently thorough and fully conveys the scope of the disclosed embodiments to those who are skilled in the art. Numerous specific details are set forth, such as examples of specific aspects, apparatuses, elements, devices, and methods, to provide a thorough understanding of embodiments of the present disclosure. Nevertheless, it will be apparent to those skilled in the art that specific disclosed details need not be employed, and that exemplary embodiments may be embodied in different forms. As such, the exemplary embodiments should not be construed to limit the scope of the disclosure. In some exemplary embodiments, well-known processes, well-known device structures, and well-known technologies may not be described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "engaged to", "connected to," "coupled to," or like terminology in relation to another element or layer, it may be directly on, engaged, connected or coupled to the other element or layer, or intervening elements or layers may be present. In contrast, when an element is referred to as being "directly on," "directly engaged to", "directly connected to," "directly coupled to" or like terminology in relation to another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

The disclosed embodiments provide at least protective equipment, garments, and the like (which may be referred to by collective terms and phrases herein throughout) 10 that serve in the prevention of concussive effects on the heart 102, cardiopulmonary system 204, internal organs and other body parts, and the like, by a received force. The concussive effects prevented by the disclosed embodiments may owe the provided functionality to the variety of layers that constitute the protective equipment. These layers may have various constituents, various thicknesses, and may be provided in various combinations that may modify the performance of the protective equipment, but which are nevertheless covered by the disclosed embodiments. For example, although an aramid layer 12 discussed herein may experience enhanced performance by having applied thereto an elastomeric coating 14, 16 on both sides thereof, those of ordinary skill in the pertinent arts will appreciate in light of the discussion herein that such coatings may be provided on only one side of the aramid layer or may be provided by various optional elastomeric components, or elastomeric combination in combination with other constituents or features, such as protective randomly distributed nanofibers and the like.

Figure 1B:
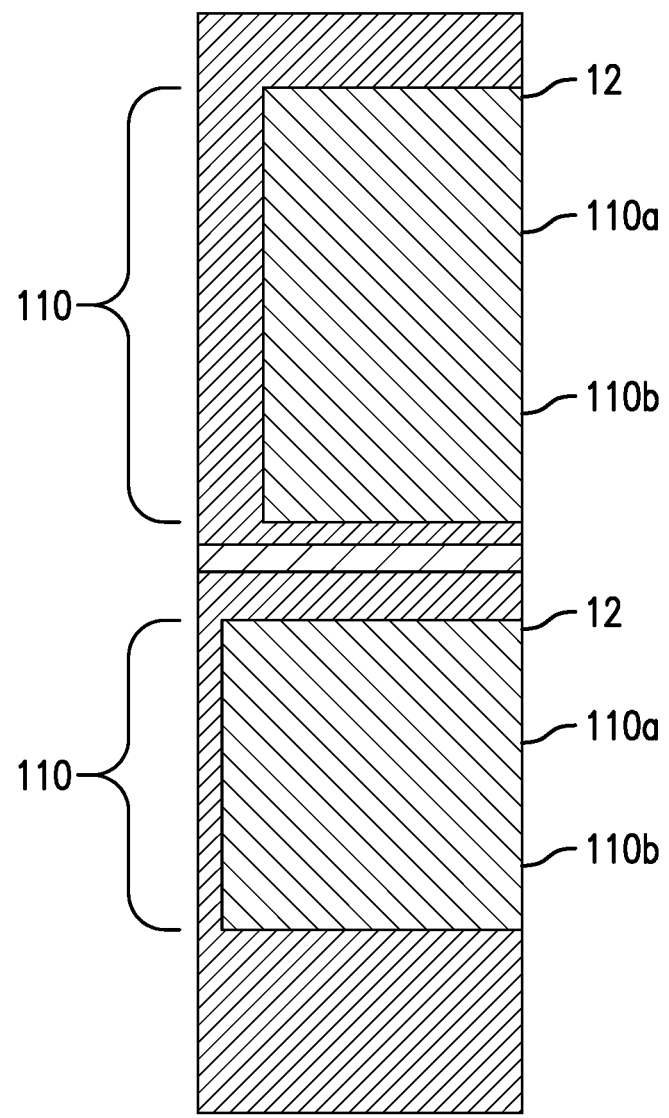

More specifically, a pad, panel, or multiple pads or panels 100, 100a, 100b, 100c . . . , in addition to other arrangements (which may be referred to by collective terms or phrases herein throughout), may be provided that comprise the aforementioned coated aramid layer or layers. These apparatuses, which may be hereinafter referred to collectively as panels 100a, 100b, 100c, may, for example, include other layers in addition to a coated aramid layer. For example, a multidurometer layer or layers 110, 110a, 110b, such as may be formed of different durometer foams or multiple layers of foam of differing durometer, may be provided in association with a coated aramid layer. By way of non-eliminating example, optimized performance may be achieved through the use 110 of foam layer or layers having dual durometers, such as a high-density foam and low-density foam in combination. By way of example, a low-density foam aspect may have a density of twelve to thirty-two pounds per cubic foot and most particularly may have a density of twenty pounds per cubic foot, while a low-density foam may have a density of three to twelve pounds per cubic foot, and most particularly nine pounds per cubic foot. These multidensity foams may form a multidurometer layer 110 that may serve to dissipate a received concussive force 210, and which may, on a face of the protective pad the outermost foam layer, be physically associated with a coated aramid layer, which coated aramid layer 12 may be most or least proximate in the protective equipment to the body 220. This arrangement is illustrated in FIGS. 1A and 1B, wherein a nine-pound per cubic foot low-density foam forms the innermost layer 110a of a panel, a thirty-one pound per cubic foot high density foam forms a middle layer 110b of the protective equipment, and a coated aramid 12 having a coating of elastomeric 14, 16 on both sides thereof forms the outermost layer of the protective equipment.

TABLE 1

| Chest protector | Accelleron ® closed cell high density foam | Airilon ® closed cell low density soft foam | Open cell memory foam | TriDur ® | ImpacShield ®, -multilayer semi-rigid polypropylene polymer | No of Impacts | No of VF | VF (%) |
|---|---|---|---|---|---|---|---|---|
| Control |  |  |  |  |  | 80 | 43 | 54 |
| 1 | 6 |  |  | .35 | .33 | 33 | 11 | 33 |
| 3 | 6 |  |  | .35 |  | 33 | 18 | 54 |
| 6 | 10 | 8 |  | .35 | .33 | 25 | 2 | 8 |
| 7 | 6 | 6 |  | .35 | .33 | 25 | 5 | 20 |
| 8 | 10 | 10 |  | .35 | .33 | 20 | 4 | 20 |
| 9 | 10 | 10 |  | .35 | .67 | 20 | 1 | 5 |
| 10 |  |  | 12 | .35 |  | 20 | 10 | 50 |
| 11 |  |  | 12 | .35 | .33 | 15 | 9 | 60 |
| 12 |  |  | 12 | .35 |  | 15 | 6 | 40 |
| 13 | 6 |  | 8 | .35 | .33 | 15 | 9 | 40 |
| 14 | 10 |  | 10 | .35 | .33 | 12 | 4 | 33 |
| 15 | 10 |  | 10 | .35 | .67 | 12 | 5 | 42 |

As referenced above, and as illustrated in Table 1, the arrangement of FIG. 1 may have the various layers thereof formed of different thicknesses and weights. By way of non-eliminating example, the multidurometer foam layer discussed herein may provide an eighty-four percent effective reduction in forces at a combined thickness of one-half inch, a ninety-percent effective reduction in forces at a combined thickness of three-quarters of an inch, and a ninety-five percent reduction at a combined thickness of one inch. Moreover, the coating weight thickness on the aramid layer may vary in order to effectuate variations in performance, such as in the range of 1-3 ounces, such as 2.2 ounces, per square yard of aramid material.

Additionally, other layers beyond those illustrated in FIG. 1, or those optionally illustrated in FIG. 1, may be included. For example, additional shielding 120 may be provided at the innermost layer of a panel closest to the body, or at the outmost layer closest to the received force, in order to further shield the body from the received force. Such additional shielding 120 may, by way of non-limiting example, comprise a single or multilayer semi-rigid or rigid polypropylene polymer. This additional layer may have a thickness, by way of non-limiting example, in the range of 0.20-1 mm, and more particularly in the range of 0.35-0.67 mm.

Yet further, the thicknesses of layers independently, as well as in combination, may be varied in certain circumstances. For example, protective equipment having panels inclusive of a multi-durometer layer, may, in certain environments, preferably have minimal thickness. For example, in the event a panel is to be inserted into a helmet, such as in a pliable helmet insert, the desired total thickness of the embodiment described in FIG. 1 may be approximately four millimeters, or more preferably, in the range of three millimeters to six millimeters.

Because the disclosed embodiments may provide multi-durometer layers, such as including high-density and low-density foams, in which may correspondingly comprise high durometer and low durometer foams, energy absorption of the provided panels is optimized. This is distinctly contrary to the known art, wherein only low-density/low durometer foam is employed in order to provide maximum comfort. However, because of the high level of deformation suffered by low-density foam, equipment employing only low-density foam compresses so significantly at impact that it does little prevent concussive effect on the body. Contrary to the known art, the disclosed embodiments provide significant comfort even including the use of a high-durometer, such as a four durometer foam, such as in the six to nine pound per cubic foot density range, in part because the high-durometer foam is used in combination with the low-durometer foam such that the thickness of the high-durometer foam is minimized. That is, the disclosed embodiments provide appreciably improved performance through the use of combination of foam densities, i.e., optimal performance is achieved by combining foams of different densities.

Moreover, certain of the layers provided in association with the disclosed protective equipment may have preferred characteristics due to the nature of the remaining layers. By way of non-eliminating example, coating layers provided over the aramid portions specifically may be colored, due to the damage that light can inflict on aramid performance. Yet further, the presence of particular layers may indicate the non-presence of other layers. For example, multiple high-density foam layers may be operationally less desirable than a multi-durometer layer disclosed herein, such as because only single or singular frequencies of impact force may be eliminated by multiple layers having similar or the same uniformity. Further, overly thick coating layers in association with the aramid layer, and/or multiple aramid layers, may be undesirable because forces to be dissipated are instead trapped between layers and allowed to oscillate rather than dissipate. Still further, the order of particular layers in the protective equipment discussed herein may indicate the placement or order of other layers. For example, performance may be degraded significantly if the coated aramid layer is placed in the outermost portion, i.e., most adjacent to the impact, of the disclosed panels.

In a method of selecting the make-up of a multi-layer, multidurometer material that may include multiple layers of foam with different durometers, a coated aramid layer, and optionally a rigid polyurethane layer, the selection of the durometers and thicknesses of the foam and aramid layers may be in a manner that effectively dissipates a broad spectrum of frequencies of received force. Or, the durometers or thicknesses of the foams and the aramid layer may be selected to dissipate a specific range of frequencies of received force.

Those skilled in the art will appreciate that various different aramids may be employed based upon the desired protective effects. For example, KEVLAR® K49 may be employed to optimize vibration absorption; K79 may be employed to minimize stabbing forces; and K29 and K129 may be provided to maximize protection again point impact or ballistics forces.

Those skilled in the art will appreciate various particular embodiments that may be indicated by the aspects discussed herein. For example, the disclosed protective equipment 208 may be or may be included in an athletic shirt 208a, which may be lightweight and/or have wicking properties, and wherein such wicking properties do not adversely affect the performance of the aramid layer, at least in part due to the presence of the coating on the aramid layer; the protective equipment may comprise an athletic chest protector 208b, such as may be used in lacrosse, cricket, baseball, football, soccer, softball, or the like; or the protective equipment may be provided as a wearable harness, such as through the use of VELCRO® straps or the like. The protective aspects may be stitched into equipment 208 or garments 208, inserted into pre-formed pouches, or otherwise integrated with wearable items. The protective equipment may further be utilized in athletic helmets or headbands, such as for example baseball, football, soccer, lacrosse, or the like.

Figure 2:
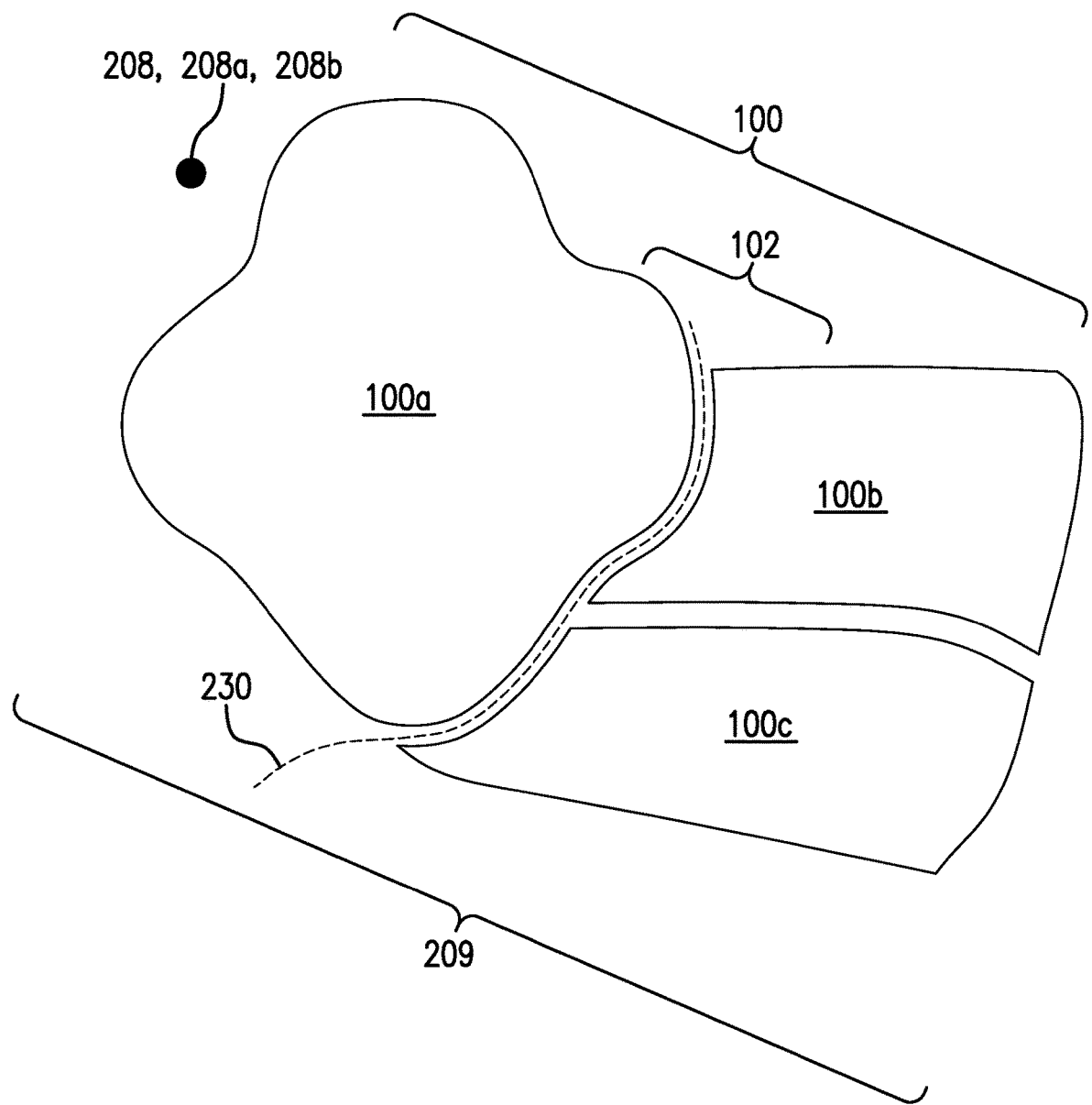
FIG. 2 illustrates an embodiment of an exemplary protective multi-sectional garment pad.

Additionally, a single pad or a panel 100a, 100b, 100c may be provided, as may be multiple pads or panels 100, such as in an interlocking format 100, such as in order to optimize flexibility and mobility in various contexts. By way of non-limiting example, FIG. 2 illustrates protective equipment 208 for association with an athletics shirt, such as may be worn by a baseball pitcher, in which three panels 100a, 100b, 100c are interlocked 230 within a sports shirt 208a in order to allow maximum mobility for the athlete wearing the shirt.

Those skilled in the art will further appreciate that, in a multiple panel and/or interlocking panel context, all panels may not be uniform in size or shape, and different ones of the panels may be provided differently in order to optimize protective coverage. By way of non-eliminating example, the two smaller more rectangular pads 100b, 100c shown in the three panel combination of FIG. 2 may be separately provided from the larger protective panel 100a shown in that figure. For example, the two "side" panels 100b, 100c may be provided via a VELCRO® feature, wherein, a catcher's chest protector, the two side panels may be VELCROED onto a chest protector including the larger panel, and wherein the location of such attachment may vary in order to best protect the wearer's heart 102. Accordingly, chest protectors and like equipment having an integrated protective pad or pads may have additional detachable protective equipment pads that further protect side or other portions of the body, and such detachable pads may be connectible via VELCRO®, snaps, zippers, or like detachable features.

In additional and alternative embodiments, any equipment comprised of the layers discussed herein throughout may additionally be comprised of other layers or protective aspects. By way of non-limiting example, a chest protector may include a pad or pads in accordance with the disclosed aspects only in physical locations correspondent to a prospective commotio cortis event, and may have known, i.e., low density, foam types at other portions of the chest protector, as would be typical of chest protectors in the known art.

In the foregoing detailed description, it can be seen that various features are grouped together in individual embodiments for the purpose of brevity in the disclosure. This method of disclosure is not to be interpreted as reflecting an intention that the subsequently claimed embodiments require more features than are expressly recited in each claim.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather are to be accorded the widest scope consistent with the principles and novel features disclosed herein.

What is claimed:

1. A protective garment capable of preventing commotio cordis due to a concussive blow to a side aspect of a user's cardiopulmonary system enclosed particularly within a left-lateral chest portion of the user, comprising:
   a garment body including at least one pocket portion placed only over the lateral chest portion with the greatest susceptibility to the commotio cordis when the garment body is worn by the user;
   three pads for insertion into the at least one pocket portion to thereby protect the side aspect when the garment body is worn by the user, an arrangement of the three pads consisting of a clover-leaf shaped central pad and two adjacent oblong pads interlocked with each other and to a lower-right quadrant of the clover-leaf shaped central pad, each of the three pads, comprising:
      at least one concussive-force dissipating layer;
      a multi-durometer foam layer having a similar shape and surface area to that provided by the concussive force dissipating layer, the multi-durometer foam layer comprising a most proximate part of the pad to the user when the garment body is worn by the user; and
   a shielding layer comprising a least proximate part of the pad to the user when the garment body is worn by the user.

2. The protective garment of claim 1, wherein a combination of densities of the multi-durometer foam layers reduces an impact force received directly to the multi-durometer foam layer by 84% from a distal-most plane of the multi-durometer foam layer in relation to the lateral chest portion to a proximal-most plane of the multi-durometer foam layer, when a distance between the distal-most plane and the proximal-most plane is ½ inch.

3. The protective garment of claim 1, wherein a combination of densities of the multi-durometer foam layer reduces an impact force received directly to the multi-durometer foam layer by 90% from a distal-most plane of the multi-durometer foam layer in relation to the lateral chest portion to a proximal-most plane of the multi-durometer foam layer, when a distance between the distal-most plane and the proximal-most plane is ¾ inch.

4. The protective garment of claim 1, wherein a combination of densities of the multi-durometer foam layer reduces an impact force received directly to the multi-durometer foam layer by 95% from a distal-most plane of the multi-durometer foam layer in relation to the lateral chest portion to a proximal-most plane of the multi-durometer foam layer, when a distance between the distal-most plane and the proximal-most plane is 1 inch.

5. The protective garment of claim 1, wherein the at least one concussive-force dissipating layer is rigid.

6. The protective garment of claim 1, wherein the at least one concussive-force dissipating layer is semi-rigid.

7. The protective garment of claim 1, wherein the at least one concussive-force dissipating layer is polypropylene.

8. The protective garment of claim 7, wherein the polypropylene layer has a thickness in the range of 0.20-3 mm.

9. The protective garment of claim 1, wherein the at least one concussive-force dissipating layer is aramid.

10. The protective garment of claim 1, wherein the at least one concussive-force dissipating layer is both polypropylene and aramid.

11. The protective garment of claim 1, wherein the shielding layer comprises polypropylene.

12. The protective garment of claim 1, wherein the at least one concussive-force dissipating layer comprises a polymer.

13. A protective garment capable of preventing commotio cordis due to a concussive impact to a side aspect of a user's cardiopulmonary system as enclosed particularly within a left-lateral chest portion of the user, comprising:
   a garment body including at least one pocket portion placed only over the lateral chest portion with the greatest susceptibility to the commotio cordis when the garment body is worn by the user;
   three pads for insertion into the at least one pocket portion to thereby protect the side aspect when the garment body is worn by the user, an arrangement of the three pads consisting of a clover-leaf shaped central pad and two adjacent oblong pads interlocked with each other and to a lower-right quadrant of the clover-leaf shaped central pad, each of the three pads, comprising:
      at least one concussive-force dissipating layer; and
      multi-durometer foam layers comprised of at least a force dissipating foam layer and another layer in proximate comprised of a comparatively higher density foam layer or a comparatively lower density foam layer having a similar shape and surface area to that provided by the concussive force dissipating layer, the multi-durometer foam layers formed together in the pocket portion.

14. A protective garment capable of preventing commotio cordis from a concussive impact on a side aspect of a user's cardiopulmonary system within a left-lateral chest portion of the user, comprising:
   a garment body including at least one pocket portion placed only over the lateral chest portion most susceptible to commotio cordis when the garment body is worn by the user;
   three pads for insertion into the at least one pocket portion to thus protect the side aspect when the garment body is worn by the user, an arrangement of the three pads consisting of a clover-leaf shaped central pad and two adjacent oblong pads interlocked with each other and to a lower-right quadrant of the clover-leaf shaped central pad, each of the three pads, comprising:
      at least one concussive-force dissipating layer;
      multi-durometer foam layers comprised of at least a higher density foam layer and a lower density foam layer, relative to each other, each having a similar shape and surface area to that provided by the concussive force dissipating layer, the multi-durometer foam layers being adhered together in the pocket portion and comprising a most proximate part of the pad to the user when the garment body is worn by the user; and a semi-rigid shielding layer, placed in proximity to the multi-durometer foam layers and comprising a least proximate part of the pad to the user when the garment body is worn by the user.

\* \* \* \* \*